US012045641B1

(12) United States Patent
Vaidyanathan

(10) Patent No.: US 12,045,641 B1
(45) Date of Patent: Jul. 23, 2024

(54) ENRICHED SECURITY TO VALIDATE VIRTUAL MACHINE MANAGER-LEVEL SYSTEM FUNCTIONS

(71) Applicant: Amazon Technologies, Inc., Seattle, WA (US)

(72) Inventor: Shivaramakrishnan Vaidyanathan, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 805 days.

(21) Appl. No.: 17/118,908

(22) Filed: Dec. 11, 2020

(51) Int. Cl.
    *G06F 9/455* (2018.01)
    *G06F 21/72* (2013.01)
    *H04L 9/32* (2006.01)

(52) U.S. Cl.
    CPC .......... *G06F 9/45558* (2013.01); *G06F 21/72* (2013.01); *H04L 9/3236* (2013.01); *G06F 2009/45587* (2013.01); *G06F 2009/45591* (2013.01)

(58) Field of Classification Search
None
See application file for complete search history.

(56) References Cited

U.S. PATENT DOCUMENTS

| 9,659,177 | B1 * | 5/2017 | Juels | .................. H04L 63/0869 |
| 2014/0208123 | A1 * | 7/2014 | Roth | ..................... G06F 21/575 |
| | | | | 713/189 |
| 2015/0370727 | A1 * | 12/2015 | Hashimoto | ............. G06F 21/64 |
| | | | | 711/163 |
| 2017/0364685 | A1 * | 12/2017 | Shah | ..................... G06F 21/575 |
| 2022/0066808 | A1 * | 3/2022 | Tsirkin | ............... H04L 63/0263 |
| 2022/0253330 | A1 * | 8/2022 | Nedelcu | .................. G06F 21/53 |

OTHER PUBLICATIONS

Eckel, Sep. 2020, "Secure Attestation of Virtualized Environments", Published by Springer Nature Switzerland AG 2020 (Year: 2020).*

* cited by examiner

*Primary Examiner* — Wynuel S Aquino
(74) *Attorney, Agent, or Firm* — Athorus, PLLC

(57) ABSTRACT

Described are systems and methods that may be used to compare virtual machine manager-level system operations in a host environment to verify to a guest environment, such as a virtual machine, that the requested operations have been performed and the data managed by the host on behalf of the guest is secure. The implementations may include a security monitor that interfaces with a trusted platform module included in a hardware of the host. The security monitor may work with the TPM to verify consistency between a VM operation and a corresponding VMM-level operation of the host. This verification provides transparency that the host machine is complying with its responsibility to properly manage and secure data of the VM.

18 Claims, 11 Drawing Sheets

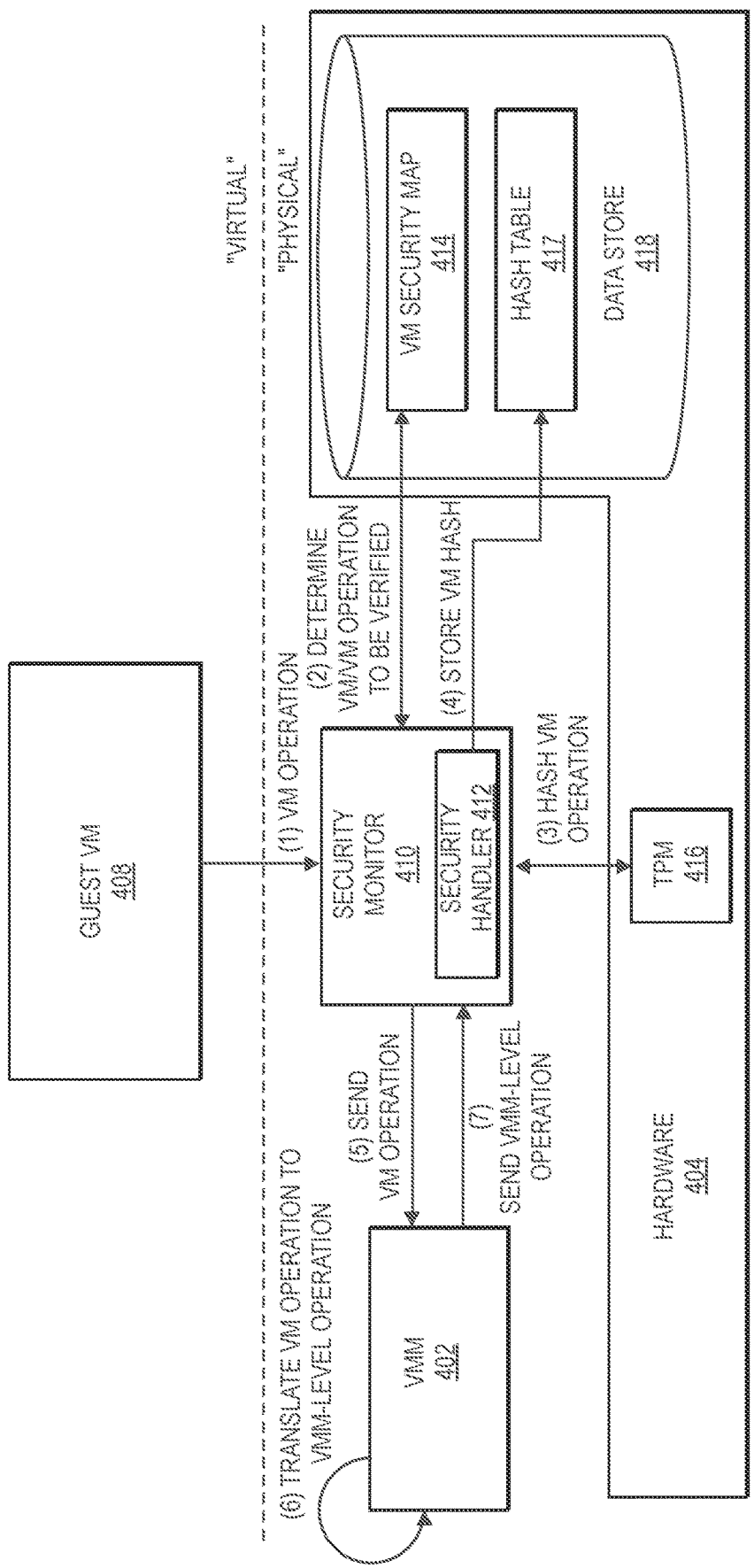

ENRICHED SECURITY TO VALIDATE VIRTUAL MACHINE MANAGER-LEVEL SYSTEM FUNCTIONS

BACKGROUND

As an increasing number of applications and services are being made available over networks such as the Internet, an increasing number of content, application, and/or service providers are turning to technologies such as cloud computing and other hosting services. Cloud computing or other hosting services, in general, is an approach to providing access to electronic resources through services, such as web services, where the hardware and/or software used to support those services is dynamically scalable to meet the needs of the services at any given time. A customer typically will rent, lease, or otherwise pay for access to resources such that the customer does not have to purchase and maintain the hardware and/or software to provide access to these resources. A potential disadvantage to such an approach, at least from a customer point of view, is that the resources typically are at a location under control of the provider of those resources, and thus are out of the direct control of the customer. In the cloud computing environment, this structure is typically controlled or governed by what is known as a shared responsibility model in which the host manages, operates, and controls the components from the host operating system and virtualization layer down to the physical security of the facilities in which the service operates. The customer assumes responsibility and management of the guest operating system, including updates, security patches, and other associated application software executing on the virtual machine of the host. While such a model works, the guest has no visibility into the performance of the host and whether the host is performing its responsibilities under the model. Likewise, in other hosting services/environments, the same drawbacks exist in that the customer does not have visibility into the activities of the host and whether the host is maintaining the data of the customer as expected.

BRIEF DESCRIPTION OF DRAWINGS

The detailed description is described with reference to the accompanying figures.

FIGS. 4A-4B illustrate example transitions for verifying the virtual machine manager-level operations of a host environment, in accordance with described implementations.

DETAILED DESCRIPTION

Described are systems, methods, computer-implemented methods, and non-transitory computer-readable media that may be used to verify virtual machine manager-level system operations ("VMM-level operations") in a host environment to verify to a guest environment, such as a virtual machine, that the requested operations have been performed and the data managed by the host is secure. As discussed further below, a security monitor may be included at the physical layer that verifies the consistency between operations sent by the guest virtual machine ("VM"), referred to herein as VM operations, and those same operations after they are translated by the virtual machine manager ("VMM") or hypervisor, referred to herein as VMM-level operations, for execution on the hardware of the host.

The security monitor may be included in the VMM or may be separate from the VMM. Regardless of the configuration, the security monitor intercepts or otherwise observes a VM operation sent from a VM prior to translation of that VM operation by the VMM and performs a hash of the VM operation. For example, the security monitor may interface directly with a Trusted Platform Module ("TPM") located on the host hardware, may send the VM operation, or a portion of the VM operation, to the TPM and the TPM may generate a VM hash value based on the received VM operation.

The security monitor may also intercept the VMM-level operation that is generated by the VMM from the VM operation sent from the VM. Like the VM operation, the VMM-level operation, or a portion thereof, may be sent to the TPM and the TPM may generate a VMM hash value. The VM hash value and the VMM hash value may then be compared to verify that the VM operation sent from the VM has not been altered by the VMM.

Such a verification of the VMM-level operations of a hosted environment, such as memory reads, memory writes, etc., improves the shared responsibility model by providing visibility and verification of the security practices of the host to the guest VMs that are trusting the host with data. In addition, any discrepancies determined between the VM operations and the corresponding VMM-level operations may be reported to the host to allow determination of the cause of the discrepancy and resolution thereof.

Various other applications, processes, and uses are presented below with respect to the various implementations.

Figure 1:
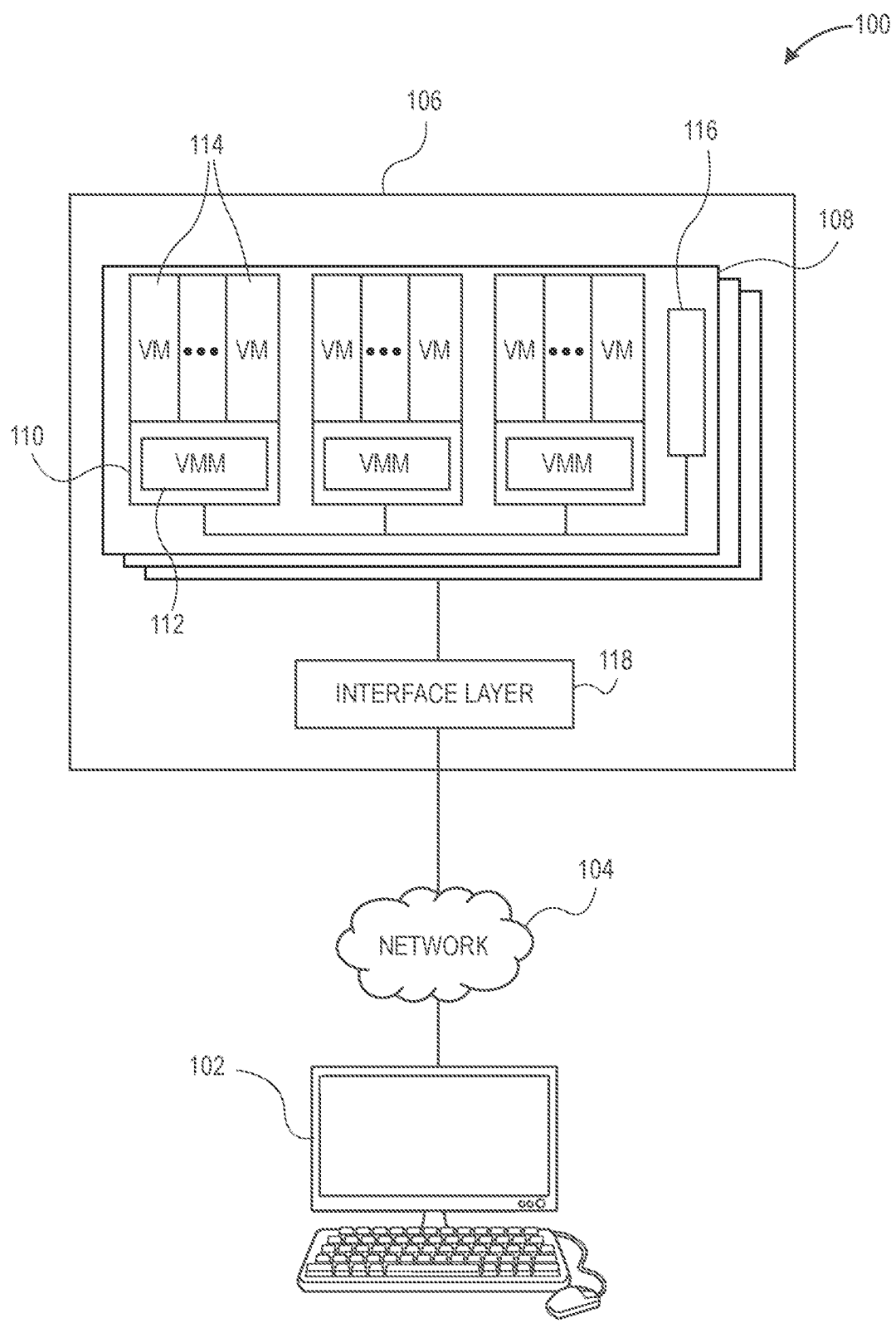
FIG. 1 illustrates an example environment in which various implementations can be implemented.

FIG. 1 illustrates an example environment 100 in which aspects of the various implementations can be implemented. In this example, a user is able to utilize a computing device 102 to submit a call or request across at least one network 104 to be received to a resource environment 106, such as a data center or "cloud" environment, among other such options. The computing device 102 can include any appropriate device, such as personal computers, cell phones, handheld messaging devices, laptop computers, set-top boxes, personal data assistants, electronic book readers, and the like. At least one network 104 can include any appropriate wired and/or wireless network, including an intranet, the Internet, a cellular network, a local area network, wide area network, public network, private network, direct connection between devices, or any other such network or combination thereof Components used for such a system can depend at least in part upon the type of network and/or environment selected. Protocols and components for communicating via such a network are well known and will not be discussed herein in detail.

The resource environment 106 in this example includes an interface layer 118, which may include components such as application programming interfaces (APIs), routers, switches, Web servers, and other such components known or used for routing communications from a user computing device 102 to an appropriate resource in the environment. In this example, the resource environment 106 includes a number of racks 108, each rack including a number of host computing devices 110, as well as an optional rack support computing system 116 in this example implementation. The host computing systems 110 on the illustrated racks 108 each host one or more VMs 114, as well as a distinct VMM 112, or hypervisor, associated with the virtual machines on that host computing system. The VMM 112 is tasked with managing the VMs on the respective host device and handling various aspects of virtualization. Each VM 114 can act as an independent computing resource for executing one or more tasks on behalf of a user, where the VM functions as a dedicated resource for the user. The environment can also include additional host computing systems that do not include distinct VMs but may nonetheless each act as a computing resource for one or more users. The rack support computing system 116 may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 106. Each computing system may also have one or more local attached storage devices, such as to store local copies of programs and/or data created by or otherwise used by the executing programs, as well as various other components.

It will be appreciated that the example of FIG. 1 has been simplified for the purposes of explanation, and that the number and organization of host computing systems and other devices may be much larger than what is depicted in FIG. 1. For example, as one illustrative implementation, there may be approximately tens of thousands of computing systems in a cloud environment, with at least some of those computing systems being host computing systems that may each host multiple virtual machines.

Figure 2:
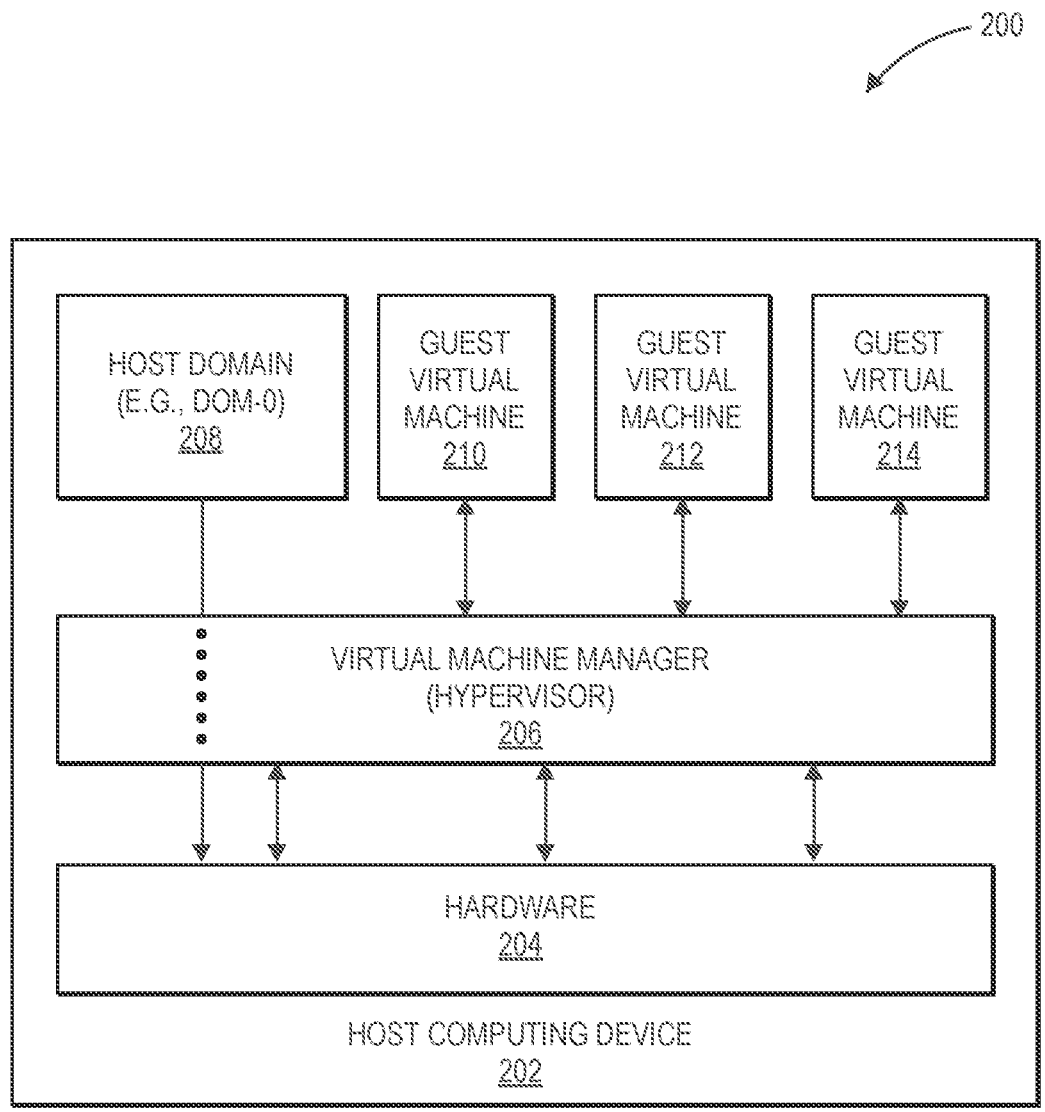
FIG. 2 illustrates an example configuration for a virtual machine manager running multiple guest virtual machines that can be used in accordance with various implementations.

A number of virtualization techniques can be used to simultaneously operate a plurality of guest virtual machines (VMs) or guest operating systems (OSs) on a given host machine. FIG. 2 illustrates an example 200 of utilizing one virtualization technique using a VMM 206, such as a hypervisor, in accordance with various implementations. The hardware 204 (e.g., the central processor and other such components) of the host computing device 202 is able to interface with the VMM 206 running directly on the hardware 204, such in the case of a "bare metal" or native hypervisor. Examples of hypervisors useful for such purposes include Xen, Hyper-V®, and the like. Hypervisors typically run at a higher, more privileged processor state than any other software on the machine and provide services such as memory management and processor scheduling for dependent layers and/or domains. The most privileged of such layers and/or domains resides in the service domain layer, which may include a host domain 208 that may include an administrative operating system for configuring the operation and functionality of the hypervisor 206, as well as that of domains of lower privilege, such as the domains of the guest virtual machines 210, 212, 214 or other operating systems, which may be heterogeneous (i.e., running different operating systems than each other). The host domain 208 (e.g., the DOM-0) may have direct access to the hardware resources 204 of the host computing device 202 by way of the hypervisor 206, while the guest virtual machines 210, 212, 214 may not.

Approaches in accordance with various implementations can take advantage of the fact that various processors allow for parallel execution of processes on a host computing device. For example, in addition to running a VMM, a security monitor may also be running at the same time that can intercept operations sent from a VM, referred to herein as VM operations, intercept VMM-level operations that are generated by the VMM from the VM operations, referred to herein as VMM-level operations, and verify that the operations as sent by the VM correspond to the VMM-level operations actually executed on the host hardware. In some implementations, the security monitor may have higher privileges than the VMM and may have access to a trusted platform module ("TPM") that resides on the host hardware, which may be used to verify the consistency between a VM operation and the corresponding VMM-level operation. As is known, a TPM is a mutually trusted secure crypto processor, such as a secure microprocessor.

Figure 3A:
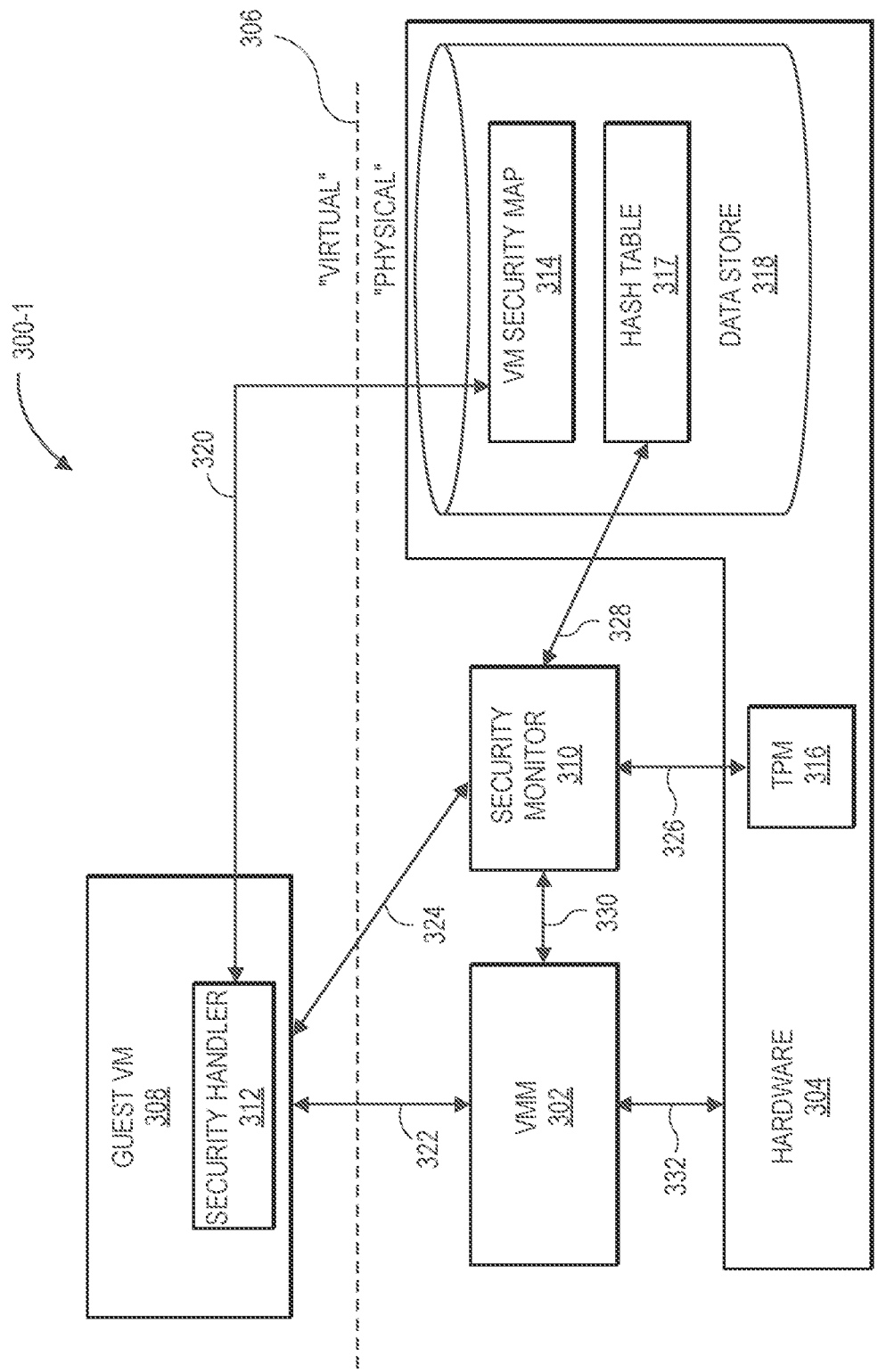
FIGS. 3A-3E illustrate example configurations that include a security monitor, in accordance with described implementations.

FIG. 3A illustrates an example configuration 300-1 of one such system that can be utilized in accordance with various implementations. A dotted line 306 separates the "physical" components (components that are the responsibility of the host—host operating system, virtualization layer, physical hardware, etc.) from the "virtual" components provided through the virtualization (components that are the responsibility of the customer—guest operating system, security patches, application software, etc.). As discussed, certain processors have virtualization hardware (e.g., Intel VT-x) to support running a security monitor 310 concurrently with an existing VMM 302.

In the example illustrated in FIG. 3A, a security handler 312 is included in the guest VM 308. The security handler 312 and the guest VM 308 are configured so that VM operations issued by the VM 308 are received by the security handler 312. The security handler 312, upon receipt of a VM operation from the guest VM 308 determines whether the VM operation should be sent to the VMM 302 for translation and execution on the hardware 304 or whether the VM operation should be sent to the security monitor 310 so that the VM operation and the corresponding VMM-level operation generated by the VMM from the VM operation can be verified by the security monitor 310.

In some instances, if there are multiple VMs 308 operating on the same or different hosts, some of the VMs may be configured to have operation verification performed while others may not be configured to have operation verification performed. For example, if a VM is providing sensitive information or applications, such as banking or the storage/access of personal information, the VM 308 may be configured to have operation verification performed on some or all VM operations sent from the VM 308. In comparison, if the VM is not providing sensitive information, it may be configured to not have operation verification performed. Accordingly, a VM security map 314 may be maintained in a data store 318 that indicates which VMs are to receive operation verification. For example, the VM security map 314 may include a lookup table or list that includes an identifier for each potential VM. The security handler 312 may have access to the VM security map, as illustrated by line 320, and, based on information maintained on the VM security map, may determine whether the VM is to receive operation verification. For example, each VM operation may include a VM identifier indicating the VM from which the VM operation was sent. The identifier may be compared with VM identifiers included in the VM security map 314 to determine whether the VM is to receive operation verification.

In addition, if a VM 308 is configured to have operation verification performed, the VM security map 314 may further indicate which types or sets of VM operations are to be verified. For example, a VM 308 may be designated to receive operation verification for a subset of all VM operations that may be issued by the VM and that subset of VM operations may be indicated in the VM security map 314. When a VM operation is generated by the VM 308, the security handler 312 may intercept the VM operation, query the VM security map 314, as illustrated by line 320, and determine that the VM 308 is to receive operation verification and further determine whether the received VM operation is to be verified.

As illustrated, the data store 318 may be included in the hardware 304 of the host and maintain the VM security map 314 and hash table 317. In other implementations, one or both of the VM security map 314 and the hash table 317 may be maintained in a data store that is separate from the hardware 304 of the host, yet accessible to the security handler 312 and/or the security monitor 310. Likewise, in some implementations, a master VM security map 314 that indicates all guest VMs, which may be executing on multiple different sets of host hardware, that are to receive operation verification may be maintained in a central data store or other memory. In such an implementation, each security handler 312 of each virtual machine may obtain or otherwise receive updates to the locally stored VM security map 314 and/or access the master VM security map on the separate data store to determine which guest VMs 308 are to receive operation verification.

In some implementations, multiple master VM security maps and/or hash tables may be maintained for different VMs and/or sets of host owned or controlled hardware and security monitors executing on those different sets of host owned or controlled hardware may have access to one or more of the master VM security maps and/or hash tables that indicate VMs that may operate or execute on that host hardware. For example, a first master VM security map for a first set of host hardware and a first set of VMs that may execute on that first set of host hardware may be maintained for a first region (e.g., city, state, country, continent, separate geographic area, availability zone, local zone, etc.) that is accessible to security monitors executing on the first set of host hardware. Likewise, a second master VM security map, which may identify a second set of VMs that is different from the first set of VMs, may be maintained and accessible to security monitors executing on the second set of host hardware for a second region that is different (logically or physically) than the first region.

If the VM operation does not need operation verification and/or if the VM 308 is not configured to receive operation verification, the security handler 312 may pass the operation on to the VMM 302, as illustrated by line 322, for translation into a VMM-level operation and execution thereof. In comparison, if the security handler 312 determines that the VM 308 is to receive operation verification and determines that the operation is to be verified, the security handler 312 may send the VM operation to the security monitor 310, as illustrated by line 324. For example, the security handler 312 may invoke or access the security monitor 310 using, for example, a system management interrupt ("SMI"). The security handler 312 may also send the VM operation to the VMM 302 for execution. In other implementations, the security handler 312 may not send the VM operation to the VMM 302 for execution.

The security monitor 310, upon receiving a VM operation from the security handler 312, may access the TPM 316 on the hardware 304 of the host and provide the VM operation, or a portion thereof, to the TPM 316, as illustrated by line 326. The TPM 316 may generate a hash value from the received VM operation or portion thereof, referred to herein as a VM hash value, and return the VM hash value to the security monitor 310, as illustrated by line 326. The security monitor 310 may store the VM hash value in a hash table 317 that is maintained in a data store 318, as illustrated by line 328.

In some implementations, because the security monitor may have higher privileges than the VMM 302, the security monitor may have access to both the data store 318 and the TPM 316, but the VMM 302 may not be able to access either the data store 318 or the TPM 316 or both.

After receiving and storing the VM hash value, if the VM operation was not provided to the VMM 302 by the security handler 312, the security monitor 310 may provide the VM operation to the VMM 302 for translation and execution, as illustrated by line 330. For example, execution can be returned to the VMM 302, or the VM 308, through a VMRESUME or similar mechanism.

The VMM 302, upon receipt of the VM operation from either the security handler 312 or the security monitor 310, may operate as normal, translating the VM operation to a VMM-level operation for execution on the hardware 304. However, prior to the VMM-level operation being executed, the security monitor 310 may intercept the VMM-level operation generated by the VMM 302 and provide the VMM-level operation, or a portion thereof, to the TPM 316, as illustrated by lines 330 and 326, respectively. Similar to the above, interception of the VMM-level operation may be done through an SMI, a hypercall, a VMCALL, or similar mechanism. Alternatively, the VMM 302 may be configured to send the VMM-level operation to the security monitor 310 for verification.

Similar to hashing of the VM operation, the TPM 316 may hash the received VMM-level operation or portion thereof to produce a VMM hash value that is provided back to the security monitor 310, as illustrated by line 326. The security monitor 310 may compare the VMM hash value and the stored VM hash value to verify that the two hash values match.

If the stored VM hash value and the VMM hash value match, it is verified that the VM operation sent from the VM 308 and the corresponding VMM-level operation that is executed on the hardware 304 are the same. In comparison, if the hash values do not match, such a discrepancy can be alerted to the VM 308.

In some implementations, the VMM-level operation may be held by the security monitor and not executed on the hardware until it is verified that the stored VM hash value and the VMM hash value match. Once verified, the security monitor may allow the VMM-level operation to be performed. For example, the security monitor 310 may provide a notification, such as a VMRESUME, or similar mechanism, back to the VMM 302, as illustrated by line 330, to allow the VMM 302 to execute the VMM-level operation on the hardware 304, as illustrated by line 332.

Figure 3B:
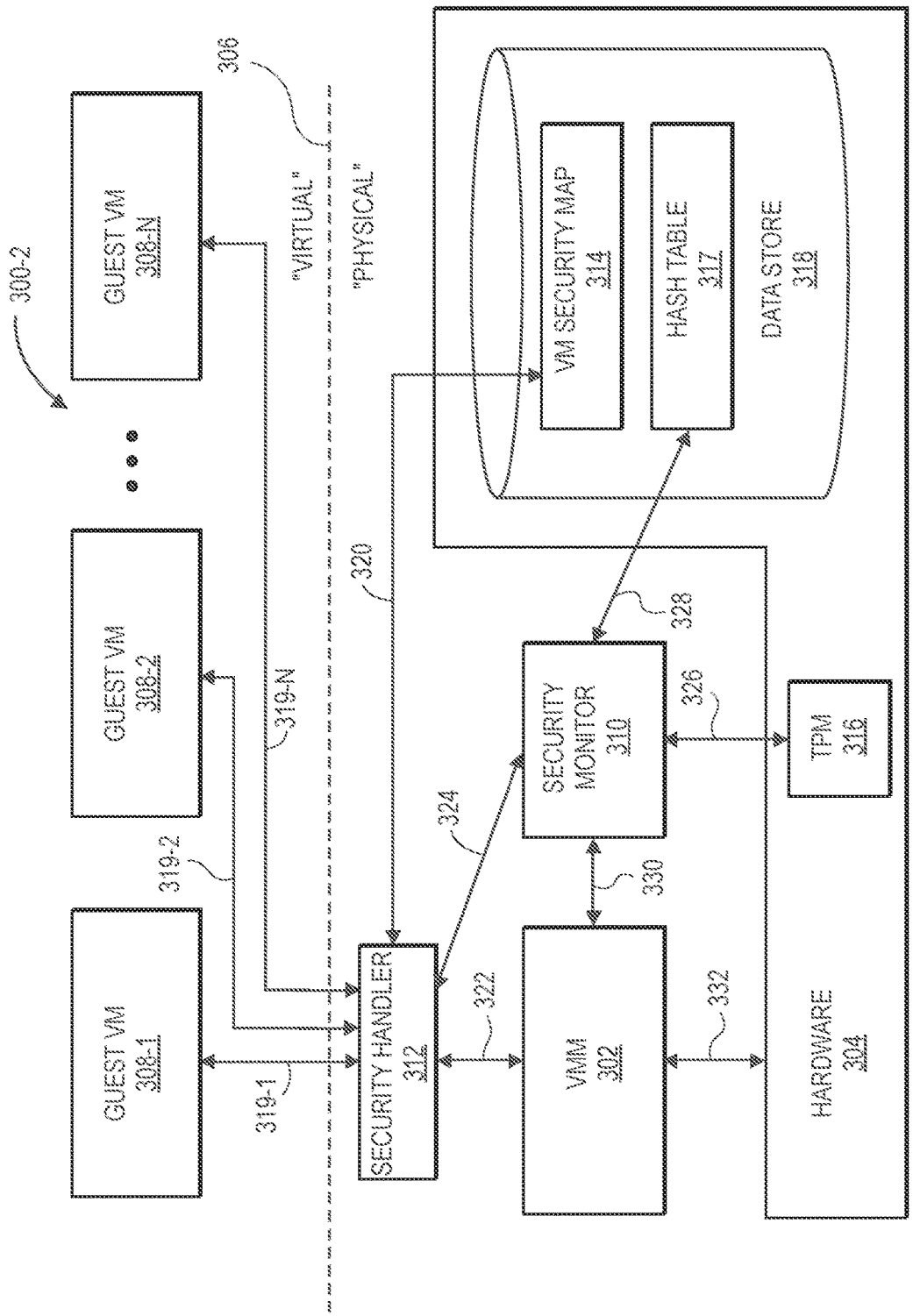

FIG. 3B illustrates another example configuration 300-2 of one such system that can be utilized in accordance with various implementations. Similar to FIG. 3A, a dotted line 306 separates the "physical" components from the "virtual" components provided through the virtualization.

In the example illustrated in FIG. 3B, the security handler 312 is separate from the VM 308 and positioned on the physical side such that the security handler 312 receives all VM operations from the VM 308. As illustrated, in implementations in which the host machine is supporting multiple VMs, such as VMs 308-1, 308-2 through 308-N, each VM 308-1, 308-2, through 308-N may be configured to send VM operations to the security handler 312, as illustrated by lines 319-1, 319-2, and 319-N. The single security handler 312 of the host may determine which VMs 308 are to receive operation verification and, for VM operations from those VMs, whether or not the VM operation is to be verified. For example, the security handler 312 may access the VM security map 314 that is maintained in the data store 318, as illustrated by line 320, to determine which VMs 308-1 through 308-N are to receive operation verification. In addition, if a VM 308 is configured to have operation verification performed, the VM security map 314 may further indicate which types or sets of VM operations are to be verified. For example, a VM 308 may be designated to receive operation verification for a subset of all VM operations that may be issued by the VM and that subset of VM operations may be maintained on the VM security map 314. In other examples, a VM 308 may be configured to have all VM operations verified.

If a VM operation received by the security handler 312 does not need operation verification and/or if the VM 308 is not configured to receive operation verification, the security handler 312 may pass the operation on to the VMM 302 for translation to a VMM-level operation and execution, as illustrated by line 322. In comparison, if the security handler 312 determines that the VM 308 is to receive operation verification and determines that the operation is to be verified, the security handler 312 may send the VM operation to the security monitor 310, as illustrated by line 324. For example, the security handler 312 may invoke or access the security monitor 310 using, for example, a SMI. The security handler 312 may also send the operation to the VMM 302. In other implementations, the security handler 312 may not send the operation to the VMM 302.

The security monitor 310, upon receiving a VM operation from the security handler 312 may access the TPM 316 on the hardware 304 of the host and provide the VM operation, or a portion thereof, to the TPM 316, as illustrated by line 326. The TPM 316 may generate a hash value based on the received VM operation or portion thereof, referred to herein as a VM hash value, and return the VM hash value to the security monitor 310, as illustrated by line 326. The security monitor 310 may store the VM hash value in a hash table 317 that is maintained in a data store 318, as illustrated by line 328.

In some implementations, because the security monitor 310 may have higher privileges than the VMM 302, the security monitor may have access to both the data store 318 and the TPM 316, but the VMM 302 may not be able to access either the data store 318 or the TPM 316. As noted above, the VM security map 314 and/or the hash table 317 may be maintained in a data store 318 included in the hardware of the host. Alternatively, or in addition thereto, the VM security map 314 (or a master VM security map) and/or the hash table 317 may be maintained in a data store that is separate from the hardware 304 of the host but accessible to the security hander 312 and/or the security monitor 310.

After receiving and storing the VM hash value, if the VM operation was not provided to the VMM 302 by the security handler 312, the security monitor 310 may provide the VM operation to the VMM 302 for translation and execution, as illustrated by line 330. For example, execution can be returned to the VMM 302, or the VM 308, through a VMRESUME or similar mechanism.

The VMM 302, upon receipt of the VM operation from either the security handler 312 or the security monitor 310, may operate as normal by translating the VM operation to produce a VMM-level operation for execution on the hardware 304. However, prior to the VMM-level operation being executed, the security monitor 310 may intercept the VMM-level operation generated by the VMM 302 and provide the VMM-level operation, or a portion thereof, to the TPM 316, as illustrated by lines 330 and 326, respectively. Similar to the above, interception of the VMM-level operation may be done through an SMI, a hypercall, a VMCALL, or similar mechanism. Alternatively, the VMM 302 may be configured to send the VMM-level operation to the security monitor 310 for verification.

Similar to hashing of the VM operation, the TPM 316 may hash the received VMM-level operation or portion thereof to produce a VMM hash value that is provided back to the security monitor 310, as illustrated by line 326. The security monitor 310 may compare the VMM hash value and the stored VM hash value to verify that the two hash values match.

If the stored VM hash value and the VMM hash value match, it is verified that the VM operation sent from the VM 308 and the corresponding VMM-level operation that is actually executed on the hardware 304 are the same. In comparison, if the hash values do not match, such a discrepancy can be alerted to the VM 308.

In some implementations, the VMM-level operation may be held by the security monitor and not executed on the hardware until it is verified that the stored VM hash value and the VMM hash value match. Once verified, the security monitor may allow the VMM-level operation to be performed. For example, the security monitor 310 may provide a notification, such as a VMRESUME, or similar mechanism, back to the VMM 302, as illustrated by line 330, to allow the VMM 302 to execute the VMM-level operation on the hardware 304, as illustrated by line 332.

Figure 3C:
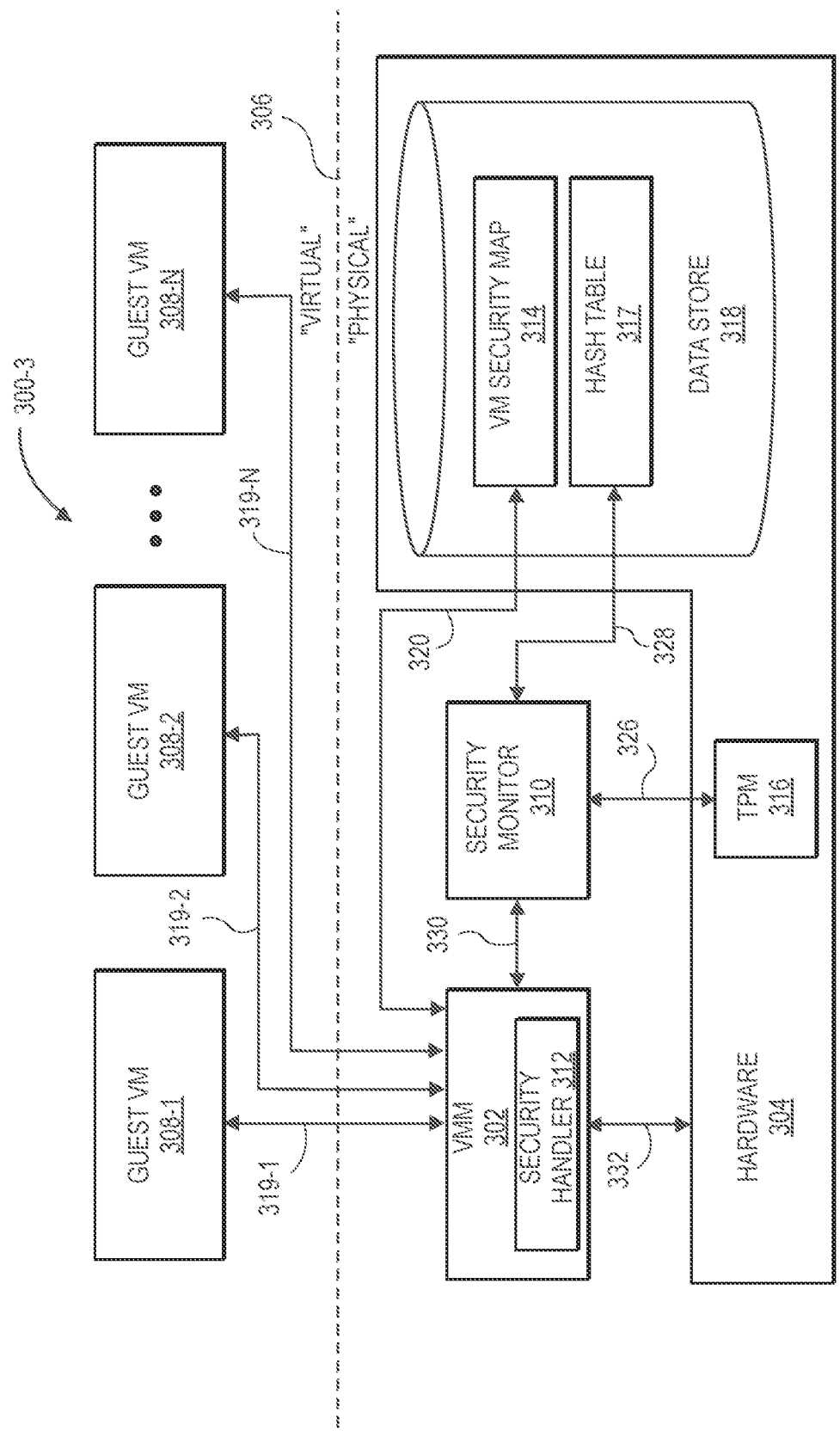

FIG. 3C illustrates another example configuration 300-3 of one such system that can be utilized in accordance with various implementations. Similar to FIGS. 3A-3B, a dotted line 306 separates the "physical" components from the "virtual" components provided through the virtualization.

In the example illustrated in FIG. 3C, the security handler 312 is included in the VMM 302. As illustrated, in implementations in which the host machine is supporting multiple VMs, such as VMs 308-1, 308-2 through 308-N, all operations from the VMs 308 supported by the host may be sent to the VMM 302, as illustrated by lines 319-1, 319-2, 319-N. The security handler 312 included in the VMM 302 may receive VM operations sent to the VMM 302 and determine which VMs 308 are to receive operation verification and, for VM operations from those VMs whether the VM operation is to be verified, as discussed above. For example, the security handler 312 may access the VM security map 314 that is maintained in a data store 318, as illustrated by line 320, to determine which VMs 308-1 through 308-N are to receive operation verification. In addition, if a VM 308 is configured to have operation verification performed, the VM security map 314 may further indicate which types or sets of VM operations are to be verified. For example, a VM 308 may be designated to receive operation verification for a subset of all VM operations that may be issued by the VM and that subset of VM operations may be maintained in the VM security map 314.

If a VM operation received by the security handler 312 does not need operation verification and/or if the VM 308 is not configured to receive operation verification, the security handler 312 may pass the operation on to the VMM 302 for translation and execution. In comparison, if the security handler 312 determines that the VM 308 is to receive operation verification and determines that the operation is to be verified, the security handler 312 may send the VM operation to the security monitor 310, as illustrated by line 330. For example, the security handler 312 may invoke or access the security monitor 310 using, for example, a SMI, a hypercall, or a VMCALL, etc. In this example, because the security handler 312 is included in the VMM, the security handler may also allow the VMM 302 to translate and execute the operation. In other examples, the operation may not be performed until execution is returned to the security handler 312 and VMM 302 by the security monitor 310.

The security monitor 310, upon receiving a VM operation from the security handler 312 may access the TPM 316 on the hardware of the host and provide the VM operation, or a portion thereof, to the TPM 316, as illustrated by line 326. The TPM 316 may generate from the received VM operation or portion thereof, a hash value, referred to herein as a VM hash value, and return the VM hash value to the security monitor 310, as illustrated by line 326. The security monitor 310 may store the VM hash value in a hash table 317 that is maintained in the data store 318, as illustrated by line 328.

In some implementations, because the security monitor may have higher privileges than the VMM 302, the security monitor may have access to both a data store 318 and the TPM 316, but the VMM 302 may not be able to access either the data store 318 or the TPM 316. As noted above, the VM security map 314 and/or the hash table 317 may be maintained in a data store included in the hardware of the host. Alternatively or in addition thereto, the VM security map 314 (or a master VM security map) and/or the hash table 317 may be maintained in a data store that is separate from the hardware 304 of the host but accessible to the security hander 312 and/or the security monitor 310.

After receiving and storing the VM hash value, if the VM operation was not translated and executed by the VMM 302, the security monitor 312 may return execution to the VMM 302 to allow translation and execution of the VM operation. For example, execution can be returned to the VMM 302, or the VM 308, through a VMRESUME or similar mechanism.

The VMM 302, upon receipt of the VM operation from either the security handler 312 or return of execution from the security monitor 310, may operate as normal by translating the VM operation to produce a VMM-level operation for execution on the hardware 304. However, prior to the VMM-level operation being executed, the security monitor 310 and/or the security handler 312 may intercept the VMM-level operation generated by the VMM 302 and provide the VMM-level operation, or a portion thereof, to the TPM 316, as illustrated by lines 330 and 326, respectively. Similar to the above, interception of the VMM-level operation may be done through a SMI, a hypercall, a VMCALL, or similar mechanism. Likewise, in this example, because the security handler 312 is included in the VMM 302, the security handler 312 may intercept the VMM-level operation and provide the VMM-level operation to the security monitor 310, as illustrated by line 330.

Similar to hashing of the VM operation, the TPM 316 may hash the received VMM-level operation or a portion thereof to produce a VMM hash value that is provided back to the security monitor 310, as illustrated by line 326. The security monitor 310 may compare the VMM hash value and the stored VM hash value to verify that the two hash values match.

If the stored VM hash value and the VMM hash value match, it is verified that the VM operation sent from the VM 308 and the corresponding VMM-level operation that is actually executed on the hardware 304 are the same. In comparison, if the hash values do not match, such a discrepancy can be alerted to the VM 308.

In some implementations, the VMM-level operation may be held by the security monitor or the security handler 312 and not executed on the hardware until it is verified that the stored VM hash value and the VMM hash value match. Once verified, the security monitor 310 and/or the security handler 312 may allow the VMM-level operation to be performed. For example, the security monitor 310 or the security handler 312 may provide a notification, such as a VMRESUME, or similar mechanism, back to the VMM 302 to allow the VMM 302 to execute the VMM-level operation on the hardware 304, as illustrated by line 332.

Figure 3D:
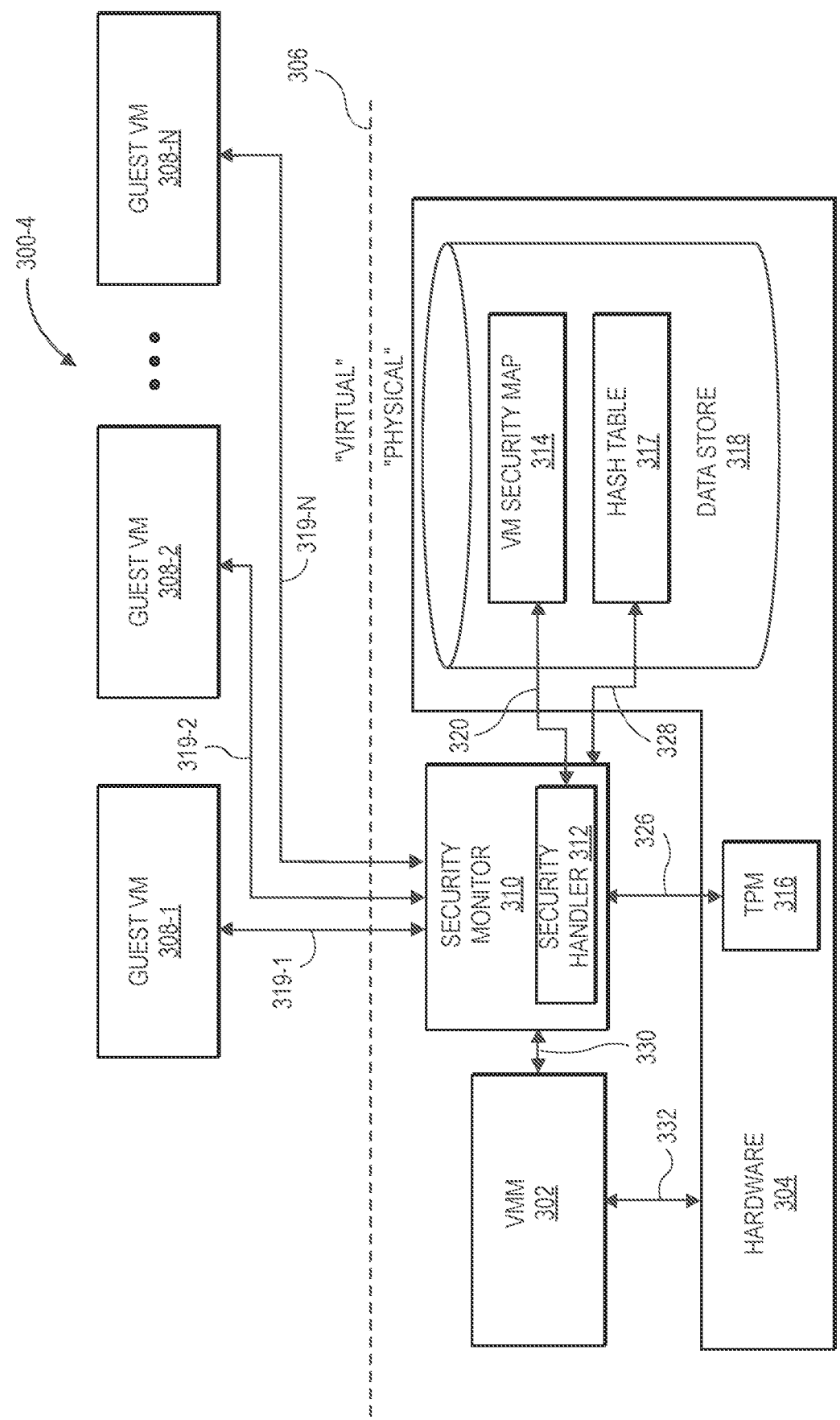

FIG. 3D illustrates another example configuration 300-4 of one such system that can be utilized in accordance with various implementations. Similar to FIGS. 3A-3C, a dotted line 306 separates the "physical" components from the "virtual" components provided through the virtualization.

In the example illustrated in FIG. 3D, the security handler 312 is included in the security monitor 310. As illustrated, in implementations in which the host machine is supporting multiple VMs, such as VMs 308-1, 308-2 through 308-N, each VM 308-1, 308-2, through 308-N may be configured to send VM operations to the security handler 312/security monitor 310, as illustrated by lines 319-1, 319-2, and 319-N. The security handler 312 included in the security monitor 310 may receive VM operations and determine which VMs 308 are to receive operation verification and, for VM operations from those VMs whether the VM operation is to be verified, as discussed above. For example, the security handler 312 may access the VM security map 314 that is maintained in a data store 318 accessible to the security handler 312 to determine which VMs 308-1 through 308-N are to receive operation verification, as illustrated by line 320. In addition, if a VM 308 is configured to have operation verification performed, the VM security map 314 may further indicate which types or sets of VM operations are to be verified. For example, a VM 308 may be designated to receive operation verification for a subset of all VM operations that may be issued by the VM and that subset of VM operations may be maintained on the VM security map 314. In another example, a VM 308 may be configured to receive operation verification for all VM operations that may be issued by the VM.

If a VM operation received by the security handler 312 does not need operation verification and/or if the VM 308 is not configured to receive operation verification, the security monitor 310/security handler 312 may pass the VM operation on to the VMM 302 for translation and execution, as illustrated by line 330. In comparison, if the security handler 312 determines that the VM 308 is to receive operation verification and determines that the VM operation is to be verified, the security handler 312 may pass execution/control to the security monitor 310 in which the security handler 312 is contained. In some implementations, as illustrated by line 330, the security monitor 310/security handler 312 may also send the VM operation to the VMM 302 for translation and execution, which may be done before, after, or while the VM hash value is generated by the TPM 316.

As discussed above, for VM operations to be verified, the security monitor 310 may access the TPM 316 on the hardware 304 of the host and provide the VM operation, or a portion thereof, to the TPM 316, as illustrated by line 326. The TPM 316 may generate from the received VM operation or portion thereof a hash value, referred to herein as a VM hash value, and return the VM hash value to the security monitor 310, as illustrated by line 326. The security monitor 310 may store the VM hash value in a hash table 317 that is maintained in a data store 318, as illustrated by line 328.

Because the security monitor may have higher privileges than the VMM 302, the security monitor may have access to both the data store 318 and the TPM 316, but the VMM 302 may not be able to access either the data store 318 or the TPM 316. As noted above, the VM security map 314 and/or the hash table 317 may be maintained in a data store included in the hardware of the host. Alternatively, or in addition thereto, the VM security map 314 (or a master VM security map) and/or the hash table 317 may be maintained in a data store that is separate from the hardware 304 of the host but accessible to the security hander 312 and/or the security monitor 310.

After receiving and storing the VM hash value, if the VM operation was not already provided to the VMM 302 for translation and execution, the security monitor 310/security handler 312 may send the VM operation and execution to the VMM 302 to allow translation and execution of the VM operation, as illustrated by line 330. For example, the VM operation and execution can be provided to the VMM 302 through a VMRESUME, or similar mechanism.

The VMM 302, upon receipt of the VM operation from the security monitor 310/security handler 312, may operate as normal by translating the VM operation to produce a VMM-level operation for execution on the hardware 304. However, prior to the VMM-level operation being executed, the security monitor 310/security handler 312 may intercept the VMM-level operation generated by the VMM 302 and provide the VMM-level operation, or a portion thereof, to the TPM 316, as illustrated by lines 330 and 326, respectively. Similar to the above, interception of the VMM-level operation may be done through an SMI, a hypercall, a VMCALL, or similar mechanism. Alternatively, the VMM 302 may be configured to send the VMM-level operation to the security monitor 310 for verification.

Similar to hashing of the VM operation, the TPM 316 may hash the received VMM-level operation to produce a VMM hash value that is provided back to the security monitor 310, as illustrated by line 326. The security monitor 310 may compare the VMM hash value and the stored VM hash value to verify that the two hash values match.

If the stored VM hash value and the VMM hash value match, it is verified that the VM operation sent from the VM 308 and the corresponding VMM-level operation that is actually executed on the hardware 304 are the same. In comparison, if the hash values do not match, such a discrepancy can be alerted to the VM 308.

In some implementations, the VMM-level operation may be held by the security monitor 310/security handler 312 and not executed on the hardware until it is verified that the stored VM hash value and the VMM hash value match. Once verified, the security monitor 310/security handler 312 may allow the VMM-level operation to be performed. For example, the security monitor 310/security handler 312 may provide a notification, such as a VMRESUME, or similar mechanism, back to the VMM 302, as illustrated by line 330, to allow the VMM 302 to execute the VMM-level operation on the hardware 304.

Figure 3E:
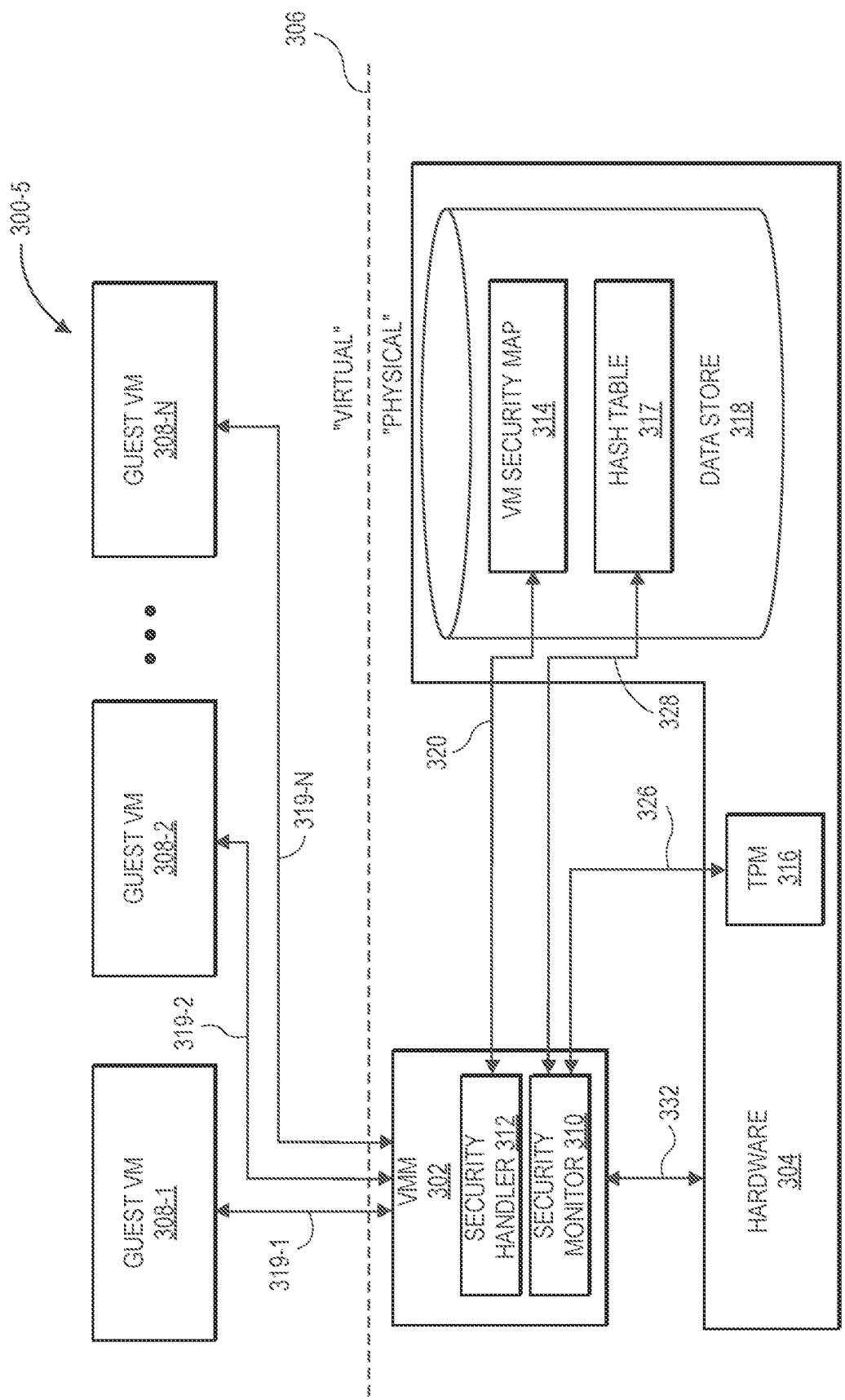

FIG. 3E illustrates another example configuration 300-5 of one such system that can be utilized in accordance with various implementations. Similar to FIGS. 3A-3D, a dotted line 306 separates the "physical" components from the "virtual" components provided through the virtualization.

In the example illustrated in FIG. 3E, the security handler 312 and the security monitor 310 are included in the VMM 302. In implementations in which the host machine is supporting multiple VMs, such as VMs 308-1, 308-2 through 308-N, all operations from the VMs 308 supported by the host may be sent to the VMM 302, as illustrated by lines 319-1, 319-2, 319-N. The security handler 312 included in the VMM 302 may receive VM operations sent to the VMM 302 and determine which VMs 308 are to receive operation verification and, for VM operations from those VMs, whether the VM operation is to be verified, as discussed above. For example, the security handler 312 may access the VM security map 314 that is maintained in a data store 318, as illustrated by line 320, to determine which VMs 308-1 through 308-N are to receive operation verification. In addition, if a VM 308 is configured to have operation verification performed, the VM security map 314 may further indicate which types or sets of VM operations are to be verified. For example, a VM 308 may be designated to receive operation verification for a subset of all VM operations that may be issued by the VM and that subset of VM operations may be maintained in the VM security map 314.

If a VM operation received by the security handler 312 does not need operation verification and/or if the VM 308 is not configured to receive operation verification, the security handler 312 may pass the operation on to the VMM 302 for translation and execution. In comparison, if the security handler 312 determines that the VM 308 is to receive operation verification and determines that the VM operation is to be verified, the security handler 312 may pass the VM operation to the security monitor 310 included in the VMM 302. In this example, because the security handler 312 and the security monitor 310 are included in the VMM, the security handler may also allow the VMM 302 to translate and execute the operation. In other examples, the VM operation may not be executed until the security handler 310 has verified the consistency between the VM operation and the VMM-level operation.

The security monitor 310, upon receiving a VM operation from the security handler 312 may access the TPM 316 on the hardware of the host and provide the VM operation, or a portion thereof, to the TPM 316, as illustrated by line 326. The TPM 316 may generate from the received VM operation or portion thereof, a hash value, referred to herein as a VM hash value, and return the VM hash value to the security monitor 310, as illustrated by line 326. The security monitor 310 may store the VM hash value in a hash table 317 that is maintained in the data store 318, as illustrated by line 328.

In some implementations, because the security monitor may have higher privileges than the VMM 302, the security monitor may have access to both a data store 318 and the TPM 316, but the VMM 302 may not be able to access either the data store 318 or the TPM 316. As noted above, the VM security map 314 and/or the hash table 317 may be maintained in a data store included in the hardware of the host. Alternatively, or in addition thereto, the VM security map 314 (or a master VM security map) and/or the hash table 317 may be maintained in a data store that is separate from the hardware 304 of the host but accessible to the security hander 312 and/or the security monitor 310.

After receiving and storing the VM hash value, if the VM operation was not translated and executed by the VMM 302, the security monitor 312 may return execution to the VMM 302 to allow translation and execution of the VM operation.

The VMM 302 may operate as normal by translating the VM operation to produce a VMM-level operation for execution on the hardware 304. However, prior to the VMM-level operation being executed, the security monitor 310 and/or the security handler 312 may intercept the VMM-level operation generated by the VMM 302 and provide the VMM-level operation, or a portion thereof, to the TPM 316, as illustrated by line 326. In this example, because the security handler 312 and the security handler 310 are included in the VMM 302, the security handler 312 and/or the security monitor 310 may intercept the VMM-level operation.

Similar to hashing of the VM operation, the TPM 316 may hash the received VMM-level operation or a portion thereof to produce a VMM hash value that is provided back to the security monitor 310, as illustrated by line 326. The security monitor 310 may compare the VMM hash value and the stored VM hash value to verify that the two hash values match.

If the stored VM hash value and the VMM hash value match, it is verified that the VM operation sent from the VM 308 and the corresponding VMM-level operation that is actually executed on the hardware 304 are the same. In comparison, if the hash values do not match, such a discrepancy can be alerted to the VM 308.

In some implementations, the VMM-level operation may be held by the security monitor or the security handler 312 and not executed on the hardware until it is verified that the stored VM hash value and the VMM hash value match. Once verified, the security monitor 310 and/or the security handler 312 may allow the VMM-level operation to be executed on the hardware 304.

Regardless of the configuration utilized, as illustrated in FIGS. 3A through 3E, or another such confirmation, providing verification to a VM, or a user of a VM, that the actual VMM-level operations being executed on the host hardware 304 correspond to the VM operations generated by the VM, provide an improvement of existing systems that rely solely on the shared responsibility model by providing visibility to the customer (e.g., the guest VM user(s)) that the host is actually performing the host's obligations under the shared responsibility model and maintaining the guest VMs data as expected by the guest VM.

Figure 4B:
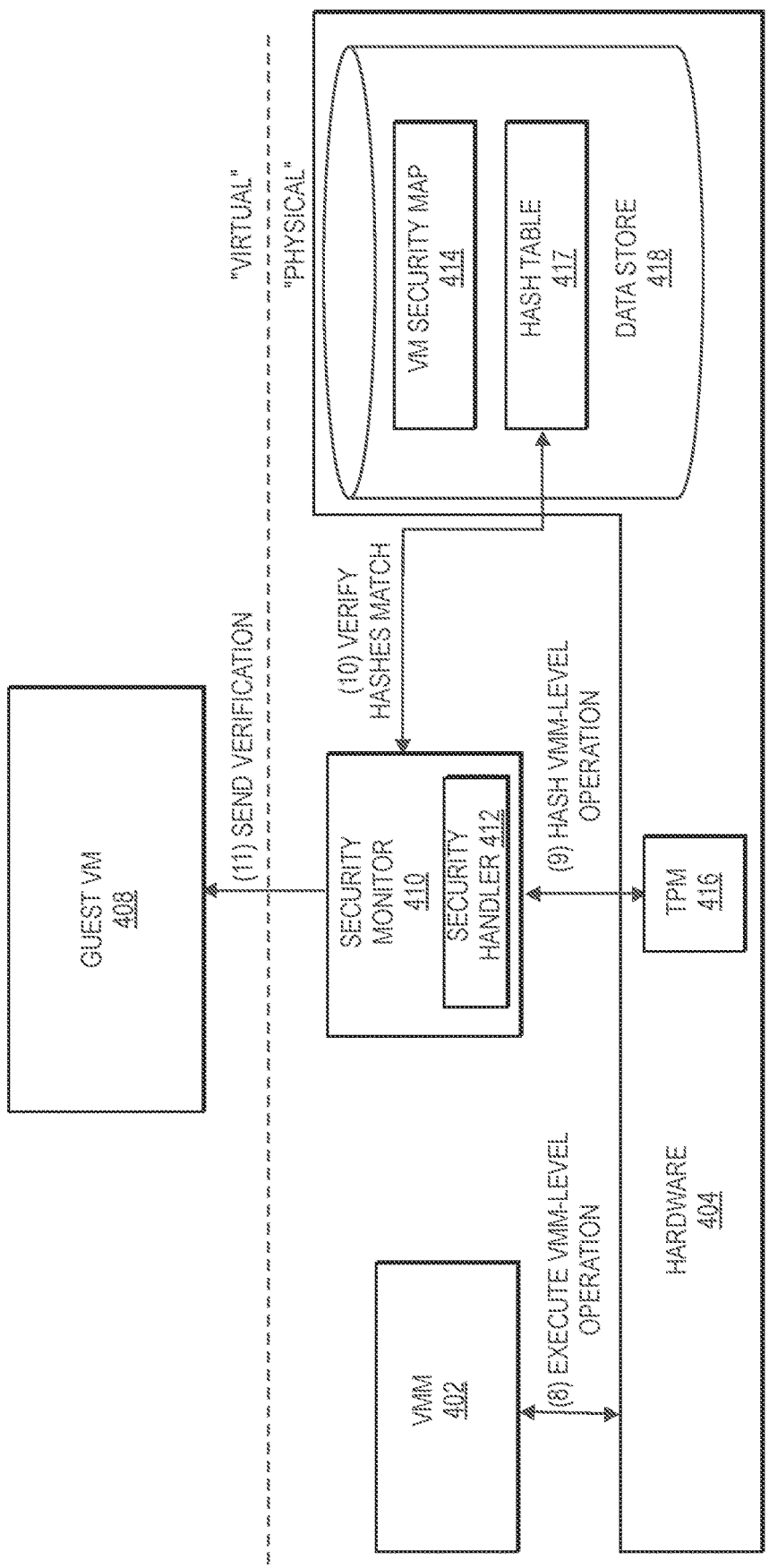

FIGS. 4A-4B illustrate example transitions for verifying the VMM-level operations of a host environment, in accordance with described implementations. The example illustrated in FIG. 4A-4B utilizes the system discussed above with respect to FIG. 3D in which the security handler is included in the security monitor and operations generated by a guest VM pass through the security monitor/security handler. However, it will be appreciated that any of the above example system structures, or other similar system structures, are equally applicable.

At (1) a VM operation is generated by a guest VM 408 executing in the virtual layer of a host. The VM operation is passed from the guest VM 408 to the security monitor 410 and the security handler 412 included in the security monitor determines, at (2) whether the guest VM 408 is to receive operation verification and, if so, whether the received VM operation is to be verified. For example, the security handler 412 may obtain a customer identifier from the received VM operation, access a VM security map 414 included in a data store 418 that is accessible to the security monitor 410/security handler 412, and determine whether the customer identifier for the guest VM 408 is indicated in the VM security map 414 as a VM that is to receive operation verification and, if so, whether the received VM operation is to be verified for that guest VM 408. As discussed above, the VM security map 414 may be maintained locally in the hardware of the host and/or may be external from the host, such as a global VM security map, that is accessible to security handlers of multiple hosts.

In this example, the security handler 412 determines that the received VM operation received from the VM 408 is to be verified. Accordingly, the security monitor 410, at (3) passes the VM operation, or a portion thereof to the TPM 416 and the TPM 416 generates a VM hash value based on the received VM operation or portion thereof. For example, portions of a VM operation, such as the payload including the instructions to be performed, should be the same between the VM operation and the VMM-level operation generated by the VMM 402 based on the VM operation. In such an example, the portion of the VM operation and the VMM-level operation that should remain common may be the portion of the VM operation that is passed to the TPM 416 and for which the TPM 416 generates the VM hash value.

After receiving the VM hash value, at (4) the security monitor stores the VM hash value in a hash table 417 and, at (5) sends the VM operation to the VMM 402 for translation and execution.

At (6), as is typical, the VMM 402 translates the received VM operation to generate a VMM-level operation representative of the VM operation that corresponds to the hardware 404 of the host rather than the virtual hardware as perceived by the guest VM 408. Various techniques, such as page tables and shadow page tables, etc., may be used by the VMM to translate VM operations from guest VM operations to VMM-level operations that may be executed on the physical host hardware 404. Such techniques are known in the art and need not be discussed further herein.

After the VM operation is translated by the VMM 402 to a VMM-level operation, at (7) the VMM-level operation is sent by the VMM 402 to the security monitor 410 and/or otherwise intercepted by the security monitor 410. Turning to FIG. 4B, in this example, at (8) the VMM-level operation is also executed on the hardware 404 by the VMM 402. As discussed above, in other implementations, the operation may not be executed on the hardware until after the consistency between the VM operation and the VMM-level operation are verified.

The security monitor 410, similar to hashing the VM operation, at (9) sends the VMM-level operation or a portion thereof to the TPM 416 and the TPM generates a VMM hash value that is provided back to the security monitor 410. As discussed above, in some examples, only the portion of the VMM-level operation, such as the payload, that should be consistent between the VM operation and the VMM-level operation may be provided to the TPM by the security monitor 410 for generation of a VMM hash value.

At (10) the security monitor 410 compares the received VMM hash value with the VM hash value stored in the VM security map to verify that the two hash values match. Finally, at (11) the security monitor 410 may provide a verification back to the guest VM 408 verifying that the VM operation sent by the guest VM and the VMM-level operation of the host match. If there is a determined discrepancy between the two hash values, an alert may be provided to the VM. Alternatively, or in addition thereto, the VMM-level operation may be prohibited from execution.

In addition to verifying the consistency between a VM operation received from a VM and a VMM-level operation generated from that VM operation, in some implementations, the security monitor may be used to verify the consistency of a file maintained in the memory of the hardware on behalf of the VM. For example, as part of a VM operation that includes a file write command that results in a file being written or stored in the host hardware, as part of the disclosed implementations, the file to be stored may be sent by the security monitor to the TPM and a file hash value generated that is maintained by the security monitor, for example in the hash table. Periodically, the filed maintained in storage of the host hardware may be again hashed by the TPM to generate a stored file hash value that is then compared to the file hash value maintained by the security monitor. If the file hash value maintained by the security monitor and the stored file hash value generated from the file maintained in storage match, it is verified that the file has not changed since it was written to memory in the host hardware. Such verification may be reported to the VM as confirmation that the stored file remains unchanged. In comparison, if the hash values do not match, an alert may generated that is provided to the VM and/or the host system to determine why the file has changed or been altered.

Such a periodic verification and reporting that files stored by a VM on the hardware of a host remain unchanged provides still further transparency to the VM or VM customers that the host is performing its obligations of properly maintaining the data of the VM or the VM customer.

Figure 5:
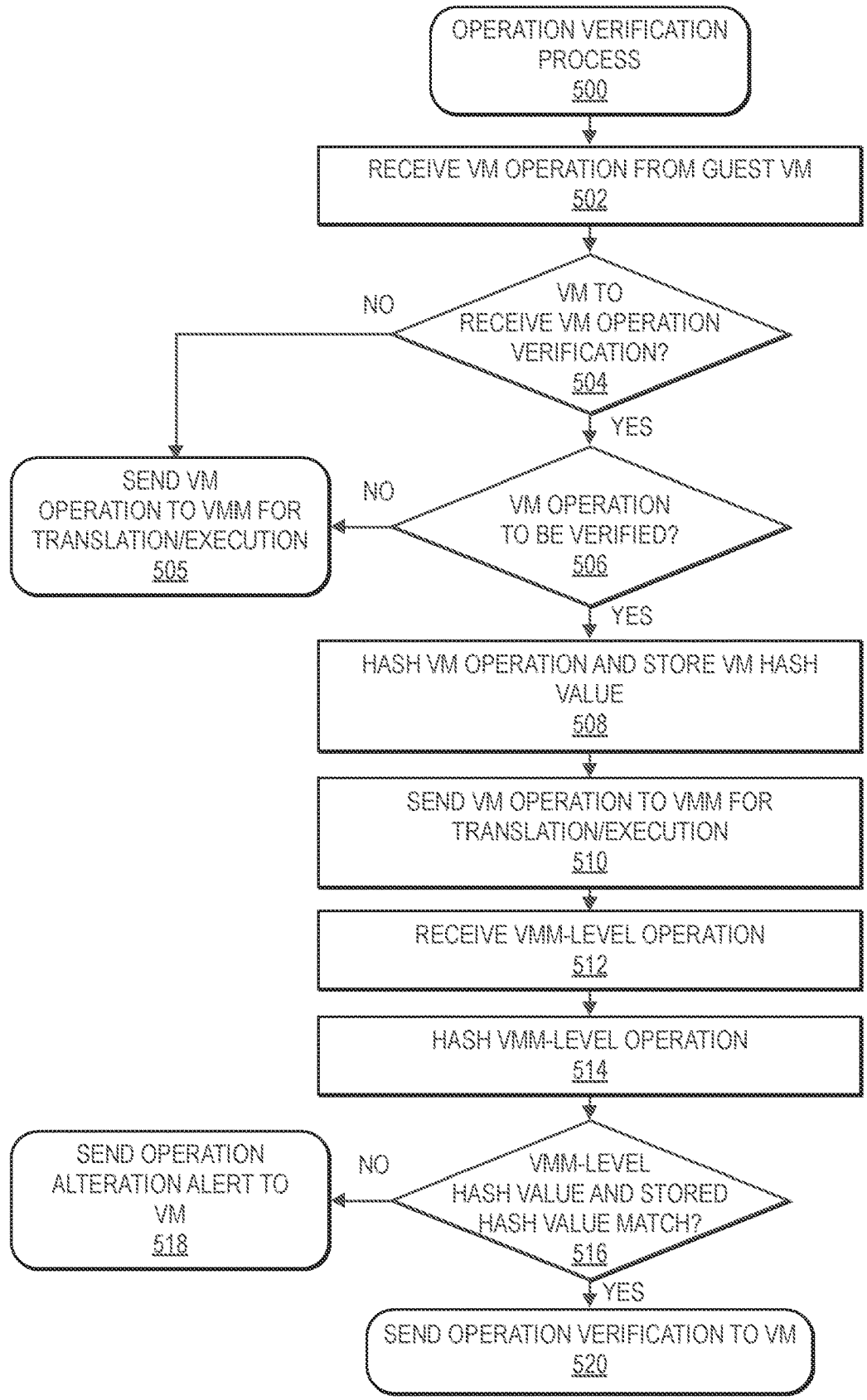
FIG. 5 is an example operation verification process, in accordance with described implementations.

FIG. 5 is an example operation verification process 500, in accordance with described implementations. The example process 500 may be performed by any of the system configurations discussed herein, or any similar system configurations that may be contemplated with the disclosed implementations.

The example process 500 begins upon receipt of a VM operation from a guest VM that is operating in the virtual layer of a host, as in 502. Upon receipt of the VM operation from the guest VM, a determination is made as to whether the VM is to receive operation verification, as in 504. As discussed above, in some examples, not all VMs may be configured to receive operation verification. For example, the implementations disclosed herein may be provided as an add-on service to other services offered by the host and users may select whether to include the add-on service to none, some, or all guest VMs the user is executing on the host. Likewise, in environments that include multiple hosts and in which users may have guest VMs operating on more than one of those multiple hosts, the disclosed implementations may be operable to determine across all hosts which VMs are to receive operation verification. For example, the VM security map, discussed above, may be accessible to all security handlers across all host systems to determine if a guest VM is to receive operation verification.

If it is determined that guest VM from which the VM operation was received is to receive operation verification, a determination may be made as to whether the received VM operation is to be verified, as in 506. Similar to the above, a VM security map may be maintained that is accessible to the example process 500, or an application executing the example process, and the VM security map may indicate which VM operations for a guest VM are to be verified.

In some implementations, rather than first determining whether a guest VM is to receive operation verification and then determining if the received VM operation is to be verified, a determination may first be made as to whether the received VM operation is a type of VM operation for which operation verification may be performed and then, if the VM operation is a type of operation for which operation verification may be performed, it may be determined whether the guest VM from which the VM operation was received is to receive operation verification. For example, in some implementations, some VM operations may be indicated as never needing operation verification. In such an example, it may be more computationally efficient to determine whether the VM operation is even a candidate VM operation for operation verification before determining whether the guest VM is to receive operation verification.

In still other examples, either or both of the decisions at decision blocks 504 and 506 may be omitted and all operations from all guest VMs may be verified and/or all VM operations that are types of VM operations that are to be verified may be verified. As another example, the decision block 506 may be omitted and all VM operations from VMs that are to receive operation verification may be verified.

Returning to FIG. 5, if it is determined at decision block 504 that the VM from which the VM operation was received is not to receive operation verification or if it is determined at decision block 506 that the VM operation is not to be verified, the received VM operation is provided to a VMM of the host for translation and execution and the example process 500 completes, as in 505.

If it is determined at decision block 506 that the VM operation is to be verified, the VM operation, or a portion thereof, is hashed to generate a VM hash value and the generated VM hash value is stored, as in 508. As discussed above, the VM operation or portion thereof may be provided to a TPM on the physical hardware of the host and the TPM may generate the VM hash value. In other examples, other trusted hardware and/or software may be utilized to generate a hash value of the provided VM operation or portion thereof.

In addition to generating the VM hash value, the VM operation is sent to the VMM of the host for translation and execution in the hardware of the host, as in 510. As discussed above, translation of the VM operation by the VMM may be performed in a traditional manner.

The VMM-level operation may then be sent, intercepted, or otherwise observed by the example process 500, as in 512. For example, as discussed above, the VMM-level operation may be intercepted by a security handler that has access to the VMM-level operation and/or the security monitor, which may have higher privileges than the VMM, may intercept the VMM-level operation once the VMM-level operation is generated by the VMM. In still other examples, the VMM may be configured to provide the VMM-level operation as part of or prior to executing the VMM-level operation in the hardware of the host.

Similar to generating the VM hash value, the VMM-level operation or a portion thereof may be hashed to generate a VMM hash value, as in 514. For example, the VMM-level operation or a portion thereof may be provided to the same TPM that was used to generate the VM hash value.

Once the VMM hash value has been generated, the VMM hash value and the stored VM hash value may be compared and a determination made as to whether the VMM hash value and the stored VM hash value match, as in 516. If it is determined that the VMM hash value and the stored VM hash value do not match, an operation alert notification may be sent to the guest VM indicating that the operation sent from the guest VM and the VMM-level operation executed in the host do not match, as in 518. In some implementations, the VMM-level execution of the operation may also be prohibited.

If it is determined that the VMM hash value and the stored VM hash value do match, an operation verification notification may be sent to the guest VM verifying that the VM operation sent from the guest VM and the VMM-level operation executed in the host match, as in 520. Likewise, in some implementations, execution of the VMM-level operation may also be authorized and performed.

Figure 6:
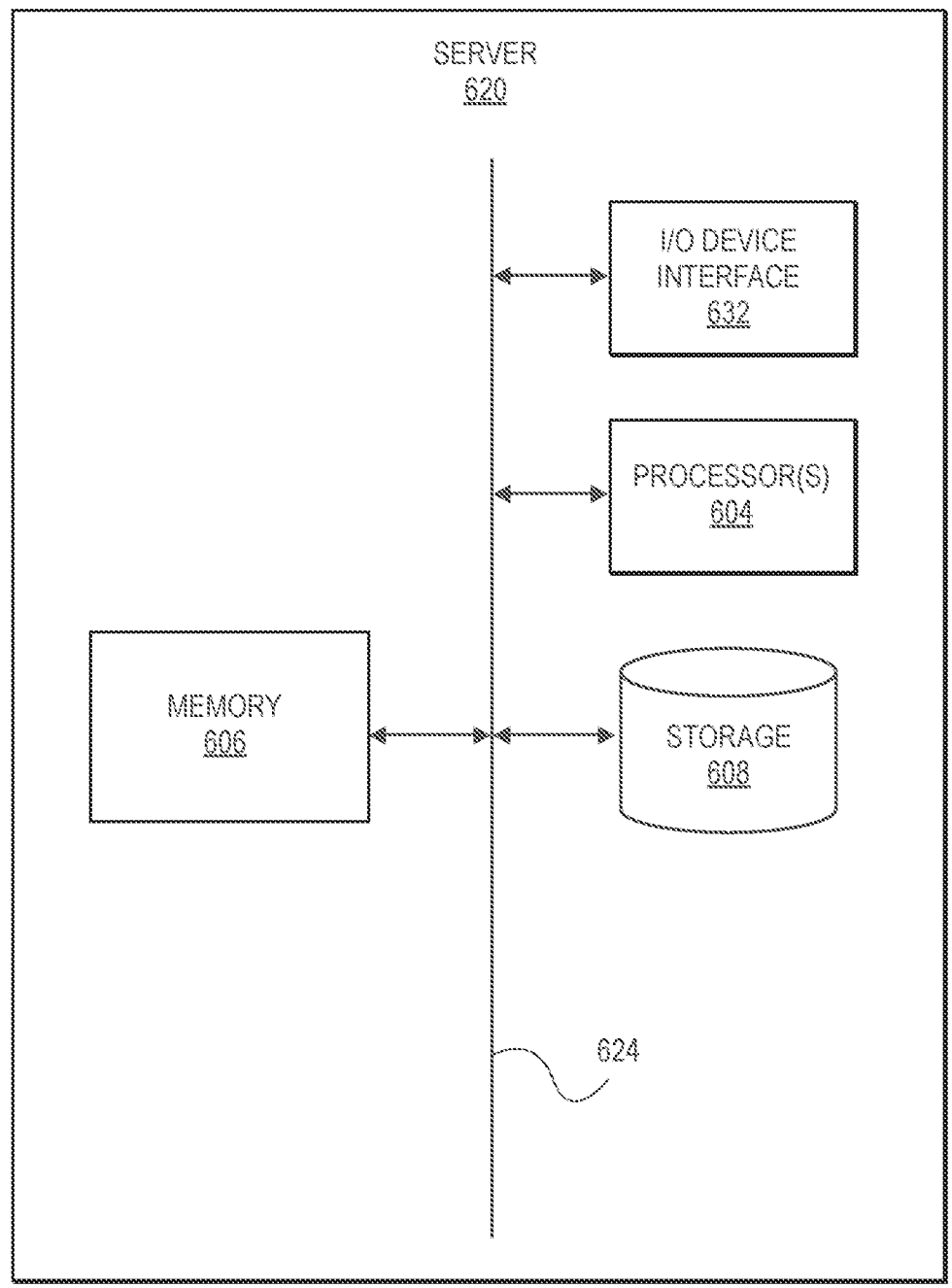
FIG. 6 illustrates example components of a server, in accordance with described implementations.

FIG. 6 illustrates example components of a server 620, in accordance with described implementations. In operation, the server 620 may include computer-readable and computer-executable instructions that reside on the server 620, as will be discussed further below.

The server 620 may include one or more processors 604, that may include a central processing unit (CPU) for processing data and computer-readable instructions, and a memory 606 for storing data and instructions of the respective device. The memories 606 may individually include volatile random-access memory (RAM), non-volatile read only memory (ROM), non-volatile magnetoresistive (MRAM) and/or other types of memory. The server 620 may also include a data storage component 608, for storing data and processor-executable instructions. The data storage component 608 may include one or more non-volatile storage types such as magnetic storage, optical storage, solid-state storage, etc. The server 620 may also be connected to removable or external non-volatile memory and/or storage (such as a removable memory card, memory key drive, networked storage, etc.) through an input/output device interface 632.

Computer instructions for operating the server 620 and its various components may be executed by the processor(s) 604, using the memory 606 as temporary "working" storage at runtime. The server's 620 computer instructions may be stored in a non-transitory manner in non-volatile memory 606, storage 608, or an external device(s). For example, the security monitor, VMM, or security handler discussed above may be implemented in software that is stored in the memory 606 and executed by the one or more processors 604, may be operable to perform some or all of the implementations discussed herein. Alternatively, some or all of the executable instructions may be embedded in hardware or firmware in addition to or instead of software.

The server 620 may also include input/output device interfaces 632. A variety of components may be connected through the input/output device interfaces. Additionally, the server 620 may include an address/data bus 624 for conveying data among components of the server 620. Each component within the server 620 may also be directly connected to other components in addition to (or instead of) being connected to other components across the bus 624.

The server 620 may use a wired and/or wireless connection to perform some or all of the disclosed implementations. Any form of wired technologies (e.g., wires, USB, fiber optic cable, etc.), wireless technologies (e.g., radio frequency, infrared, NFC, cellular, satellite, Bluetooth, etc.), and/or other connection technologies, may be utilized. For example, any one or more of 802.15.4 (ZIGBEE), 802.11 (WI-FI), 802.16 (WiMAX), BLUETOOTH, Z-WAVE, near field communication ("NFC"), direct network connection, etc., may be used. The network to which the server connects is representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, Bluetooth, etc.), and/or other connection technologies.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, virtual computing, etc., should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the components and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
  one or more processors, the one or more processors configured to operate a virtual machine manager ("VMM") and a security monitor, the security monitor configured to verify that a virtual machine operation ("VM operation") received from a virtual machine ("VM") running on the VMM corresponds to a virtual machine manager-level operation ("VMM-level operation") to be executed by the VMM on a hardware accessed by the VMM;
  a trusted platform module ("TPM") included in the hardware and accessible by the security monitor;
  a memory storing program instructions that, when executed by the one or more processors, cause the one or more processors to at least:
    receive the VM operation from the VM, the VM operation to cause execution by the VMM of the VMM-level operation in response to a verification indicative that the VMM-level operation corresponds to the VM operation;
    determine, with the security monitor, that the VM operation is to be verified;
    access, with the security monitor, a virtual machine security map to determine at least:
      that the VM is indicated to receive an operation verification; and
      that the VM operation is a VM operation type that is to be verified;
    send, from the security monitor, at least a portion of the VM operation to the TPM;
    receive, at the security monitor and from the TPM, a VM hash value generated by the TPM and based at least in part on the at least a portion of the VM operation sent to the TPM;

provide, from the security monitor, at least a portion of the VMM-level operation generated by the VMM from the VM operation to the TPM;

receive, at the security monitor and from the TPM, a VMM hash value generated by the TPM and based at least in part on the at least a portion of the VMM-level operation sent to the TPM;

compare the VM hash value and the VMM hash value to verify a match between the VM hash value and the VMM hash value, the verification indicative that the VMM-level operation corresponds to the VM operation; and in response to verification of the match between the VM hash value and the VMM hash value:
cause the execution of the VMM-level operation by the VMM on the hardware; and
provide a notification to the VM indicating that the VMM-level operation executed on the hardware corresponds to the VM operation.

2. The system of claim 1, wherein the program instructions, that when executed by the one or more processors, further cause the one or more processors to at least:
store the VM hash value in a data store that is accessible to the security monitor and inaccessible to the VMM.

3. The system of claim 1, wherein the TPM is accessible to the security monitor and inaccessible to the VMM.

4. The system of claim 1, wherein the program instructions, that when executed by the one or more processors, further cause the one or more processors to at least:
in response to receipt of the VM operation from the VM, determine that at least one of the VM or the VM operation are to receive an operation verification; and
wherein the VM operation is sent to the TPM in response to determination that the at least one of the VM or the VM operation are to receive the operation verification.

5. A computer-implemented method, comprising:
executing on one or more processors of a host machine, a virtual machine manager ("VMM") and a security monitor;
operating a virtual machine ("VM") on the VMM;
receiving, at the security monitor, a virtual machine operation ("VM operation") generated by the VM;
determining, with the security monitor, that the VM operation is to be verified;
accessing, with the security monitor, a virtual machine security map to determine at least:
that the VM is indicated to receive an operation verification; and
that the VM operation is a VM operation type that is to be verified;
sending, from the security monitor, at least a portion of the VM operation to a trusted platform module ("TPM");
receiving, at the security monitor and from the TPM, a first identifier representative of the at least a portion of the VM operation;
generating, with the VMM and based on the VM operation, a virtual machine manger-level operation ("VMM-level operation") representative of the VM operation, wherein the VM operation is configured to cause execution by the VMM in response to a verification indicative that the VMM-level operation corresponds to the VM operation;
generating, with the security monitor, a second identifier representative of at least a portion of the VMM-level operation;

comparing, with the security monitor, the first identifier and the second identifier to determine that the first identifier and the second identifier match; and in response to determining that the first identifier and the second identifier match:
sending a notification to the VM indicating that the VMM-level operation executed on the hardware of the host machine corresponds to the VM operation.

6. The computer-implemented method of claim 5, wherein:
generating the second identifier includes hashing the at least a portion of the VMM-level operation with the TPM to generate the second identifier.

7. The computer-implemented method of claim 6, wherein the at least a portion of the VM operation corresponds to a portion of the VM operation that should remain unchanged between the VM operation and the VMM-level operation.

8. The computer-implemented method of claim 6, wherein the TPM is accessible by the security monitor and inaccessible by the VMM.

9. The computer-implemented method of claim 5, further comprising:
in response to comparing the first identifier and the second identifier to determine that the first identifier and the second identifier match, executing, with the VMM, the VMM-level operation on the hardware.

10. The computer-implemented method of claim 5, further comprising:
receiving, from the VM, a second VM operation;
generating, with the security monitor, a third identifier representative of at least a portion of the second VM operation;
generating, with the VMM and based on the second VM operation, a second VMM-level operation representative of the second VM operation;
generating a fourth identifier representative of at least a portion of the second VMM-level operation;
determining, with the security monitor, that the third identifier and the fourth identifier do not match; and
in response to determining that the third identifier and the fourth identifier do not match, sending a second notification to the VM indicating that the second VMM-level operation does not correspond to the second VM operation.

11. The computer-implemented method of claim 10, further comprising:
in response to determining that the third identifier and the fourth identifier do not match, prohibiting an execution of the VMM-level operation.

12. The computer-implemented method of claim 10, wherein the third identifier is stored in a data store that is accessible to the security monitor and inaccessible to the VMM.

13. The computer-implemented method of claim 5, wherein receiving the VM operation includes receiving, at the security monitor, the VM operation.

14. The computer-implemented method of claim 5, wherein the security monitor is included in at least one of the VM or the VMM.

15. The computer-implemented method of claim 5, wherein the security monitor is separate from the VM and the VMM.

16. A non-transitory computer-readable storage medium storing program instructions that, when executed by one or more processors of a host, cause the one or more processors to at least:

operate a virtual machine manager ("VMM"), a security monitor, and a guest virtual machine ("VM");

receive, from the VM, a virtual machine operation ("VM operation");

determine, with the security monitor, that the VM operation is to be verified;

access, with the security monitor, a virtual machine security map to determine at least:
  that the VM is indicated to receive an operation verification; and
  that the VM operation is a VM operation type that is to be verified;

send, from the security monitor, at least a portion of the VM operation to a trusted platform module ("TPM");

receive, at the security monitor and from the TPM, a first hash value representative of the at least a portion of the VM operation;

generate, with the security monitor, a second hash value representative of at least a portion of a virtual machine manager-level operation ("VMM-level operation") corresponding to the VM operation and generated by the VMM, wherein the VM operation is configured to cause execution by the VMM in response to a determination that the VMM-level operation of the host corresponds to the VM operation of the VM;

determine that the first hash value and the second hash value match; and in response to determination that the first hash value and the second hash value match:
  provide a notification to the VM that the VMM-level operation of the host corresponds to the VM operation of the VM; and
  cause the execution of the VMM-level operation of the host by the VMM.

17. The non-transitory computer-readable storage medium of claim 16, wherein the VMM and the security monitor operate in parallel on the one or more processors.

18. The non-transitory computer-readable storage medium of claim 16, wherein the virtual machine security map is accessible by a plurality of security monitors of the host, including the security monitor, to determine if virtual machines or virtual machine operations are to be verified.

* * * * *